US008711401B2

(12) United States Patent
Saluja

(10) Patent No.: US 8,711,401 B2
(45) Date of Patent: Apr. 29, 2014

(54) FACILITY TO REUSE PAPER

(75) Inventor: Veena Kumari Saluja, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 814 days.

(21) Appl. No.: 12/788,621

(22) Filed: May 27, 2010

(65) Prior Publication Data

US 2011/0292453 A1 Dec. 1, 2011

(51) Int. Cl.
*G06F 3/12* (2006.01)
*B07C 5/00* (2006.01)

(52) U.S. Cl.
USPC .......................................... 358/1.15; 209/587

(58) Field of Classification Search
CPC ........... G03G 2215/00126; G03G 2215/00358
See application file for complete search history.

(56) References Cited

U.S. PATENT DOCUMENTS

| | | | | |
|---|---|---|---|---|
| 7,366,429 | B2 * | 4/2008 | Nakamoto | 399/1 |
| 2006/0285147 | A1 * | 12/2006 | Wolfman et al. | 358/1.14 |
| 2009/0161129 | A1 | 6/2009 | Lek et al. | |

OTHER PUBLICATIONS

Deniskhoo, "Want to save a tree? Buy a Dell printer that will make it easier to print on used paper," Jun. 25, 2009, 2 pgs.

* cited by examiner

*Primary Examiner* — Benny Q Tieu
*Assistant Examiner* — Sunil Chacko
(74) *Attorney, Agent, or Firm* — Fay Sharpe LLP

(57) ABSTRACT

Systems and methods are described that facilitate sorting used printed sheets of paper or other media, identifying reusable pages (i.e., pages without print on one or both sides), and outputting the reusable pages for reuse. If print is detected on one side of a used page, a security or interference pattern, or a blackout pattern, is printed over the detected print (e.g., text or the like) to conceal or obscure the print to render it illegible. In this manner, potentially sensitive or confidential information is concealed, and the reusable pages are output for use in a user-selected application (e.g., label printing, etc.) while ensuring that confidential information is obscured.

18 Claims, 8 Drawing Sheets

FACILITY TO REUSE PAPER

BACKGROUND

The subject application relates to paper reuse and waste reduction systems and methods. While the systems and methods described herein relate to paper reuse and recycling and the like, it will be appreciated that the described techniques may find application in other waste reduction systems, other paper reuse applications, and/or paper waste reduction methods.

Offices and individuals print millions of pages of documents daily, and often only on a single side of a page (e.g., simplex printing). Users often forget to select double-sided (duplex) printing as an option when they print documents, resulting in twice as many pages being printed as are necessary. Moreover, many printers automatically print a cover page for every document printed, and even for every instance of a single document for which multiple copies are printed. Additionally, blank paper sheets are sometimes included in a printed document (e.g., when blank sheets get stuck together, when a user inadvertently inserts a page break in a document, etc.). These factors contribute to waste and add cost for companies and individuals alike. Further waste occurs during recycling of simplex-printed pages, since the same amount of resources are expended to recycle a simplex printed page as are expended to recycle a duplex printed page.

Some attempts to reuse simplex-printed media have included detecting print on used pages, and sorting pages according to whether they are printed on both sides (duplex printed) or only on one side (simplex printed). Duplex printed pages are rejected, while simplex printed pages are printed on (e.g., on the clean side). However, such approaches do not provide any security for the subject matter printed on the printed side of the simplex printed pages, let alone for potentially sensitive subject matter printed on the duplex printed pages, which are simply sorted out from the simplex printed pages. Such approaches also fail to address the problem of waste generated when clean (unprinted on either side) pages are output with a document or are included in used printed media to be sorted for reuse. Moreover, classical techniques only permit subsequent printing on the clean side of the sorted simplex pages, and are inflexible with regard to other applications of the reusable pages because the reusable pages are routed directly through the printer for printing.

Accordingly, there is an unmet need for systems and/or methods that facilitate detecting and sorting pages with one or two clean or unprinted sides for reuse, and sanitizing potentially confidential information on a printed side of such pages to that the clean side of the pages may be reused, and the like, while overcoming the aforementioned deficiencies.

BRIEF DESCRIPTION

In accordance with various aspects described herein, systems and methods are described that facilitate reducing printed paper waste. For example, a system for sorting printed pages according to reusability comprises a duplex scanning document handler that receives and scans both sides of a plurality of unsorted used pages and detects print on zero or more sides of the pages. A sorting module including a processor that executes computer-executable instructions for determining whether one or more sides of an unsorted page is printed, and sorting each page according to a number of sides on which print is detected. The sorting module routes duplex printed pages with print on both sides to a first tray, orients simplex printed pages with print on only one side to face the printed side downward and routes the oriented pages to a second tray, and routes pages with no print on either side to a third tray.

According to another aspect, a method of sorting printed pages according to reusability comprises scanning both sides of a plurality of unsorted used pages and detects print on zero or more sides of the pages, determining whether one or more sides of an unsorted page is printed, and sorting each page according to a number of sides on which print is detected. The method further comprises routing duplex printed pages with print on both sides to a first tray, orienting simplex printed pages with print on only one side to face the printed side downward, routing the oriented pages to a second tray, and routing pages with no print on either side to a third tray.

According to another aspect, a method of sorting printed pages according to reusability comprises scanning both sides of a plurality of unsorted used pages and detects print on zero or more sides of the pages, determining whether one or more sides of an unsorted page is printed, sorting each page according to a number of sides on which print is detected, and routing duplex printed pages with print on both sides to a first tray. The method further comprises printing an interference pattern over printed regions on simplex printed pages with print only on one side, the interference pattern rendering the printed regions illegible, orienting the simplex printed pages to face the printed side downward, routing the oriented simplex printed pages and pages with no print on either side to a second tray, and discarding pages in the first tray.

BRIEF DESCRIPTION OF THE DRAWINGS

FIG. 2 illustrates a method of sorting printed pages for reuse in order to reduce waste and the like.

DETAILED DESCRIPTION

In accordance with various features described herein, systems and methods are described that overcome the above-described problems by providing security measures that ensure that printed pages being recycled for scrap paper or other uses are "sanitized" (e.g., printed matter is obscured) prior to outputting the pages for reuse. According to one aspect, obscuring the printed matter includes printing an interference pattern there over, blacking out the printed matter, or the like, on a printed side of a page, and outputting the page with the clean side face up for reuse. It will be appreciated that the herein-described systems and methods are not limited to paper pages, but may be employed in conjunction with any suitable media type (e.g., transparencies, or any other printable page or sheet material).

Figure 1:
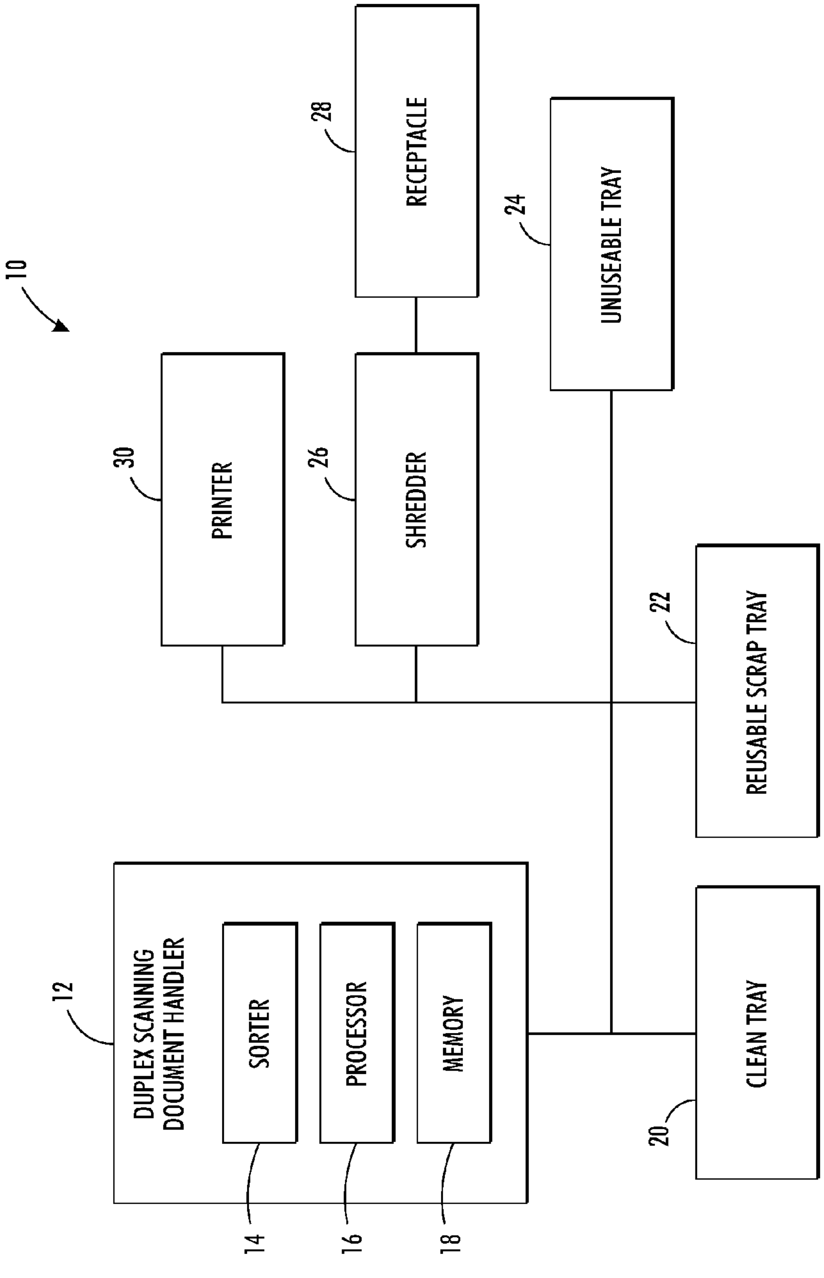
FIG. 1 illustrates a system that facilitates sorting printed pages or sheets of paper according to whether the number of sides on which the pages are printed.

FIG. 1 illustrates a system 10 that facilitates sorting printed pages or sheets of paper according to whether the number of sides on which the pages are printed, in order to identify pages that can be reused (e.g., as scrap paper for labels, notes, etc., or for reinsertion into a clean sheet hopper for subsequent print jobs). For instance, a page may be printed on one or both sides, or may not be printed at all, such as where a blank page is inadvertently inserted between two printed pages by a printer, or where a user prints a document with an inadvertently inserted page break, etc. In such cases, it is desirable to be able to sort the used pages to identify pages that may be reused, thereby reducing waste, reducing costs, and preserving the environment.

Accordingly, the system 10 includes a duplex scanning document handler (DSDH) 12 that scans both sides of the used pages to identify which sides of the pages contain print (e.g., text, graphics, etc.). The scanned pages are passed to a sorter (sorting module) 14 (shown as being integral to the DSDH 12, but which may be separate therefrom), that sorts the pages according to whether they have print on 0, 1, or 2 sides. The DSDH 12 further includes a processor 16 and memory 18 that respectively execute and store computer-executable instructions for performing the various functions (e.g., scanning, sorting, routing, printing, etc.) described herein. It will be appreciated that the sorter 14, although depicted as part of the DSDH 12 in FIG. 1, may be part of the printer 30 (e.g., a multifunction printer or the like), and may include a dedicated processor that is programmed or configured to execute stored computer-executable instructions for performing the various functions described herein. Additionally, although a single processor 16 is illustrated, it will be understood that multiple processors may be employed in conjunction with the various systems and/or modules described herein, and that the here-in described features and examples are not limited to a single processor.

The sorter routes pages with no print on either side to a clean tray 20, which may be an input tray for a printer, or may be a tray from which a user manually removes the clean sheets and inserts them into a printer. If a page has print on only one side (e.g., simplex-printed page), the sorter routes the page to a reusable scrap tray 22, which may be a tray from which a user removes the pages for use in another application (e.g., as scrap paper, for use in printing labels on the clean side, etc.), or may be an input tray for another printing module (e.g. a label printer (not shown) or the like). In another example, clean pages without print on either side are routed to the reusable tray along with simplex-printed pages. If a page has print on both sides (e.g., a duplex-printed page), then it is not reusable, and the sorter 14 routes the page to an "unusable" tray 24, where it is manually or automatically removed for discarding or destruction (e.g., if the page contains potentially confidential or sensitive information.

In one example, the sorter 14 routes pages with print on only one side to a printer, where the print is obscured for security purposes. For instance, a security pattern (e.g., a watermark, an interference pattern, a black-out mark or marks, etc.) are printed on the printed side of the page and/or over the text or graphic to obscure the graphic so that sensitive material is not readable. The page is then routed to the reusable scrap tray 22.

In another example, the sorter module 14 routes pages with print on both sides to a shredder 26, where they are shredded to ensure that any sensitive material printed on the page(s) is destroyed. The page passes through the shredder 26 and into a receptacle 28. According to one aspect, the unusable tray 24 is an input tray for the shredder 26, and pages are automatically fed to the shredder therefrom. According to another aspect, pages are manually moved from the unusable tray 24 to the shredder 26.

As previously mentioned, the system 10 comprises the processor 16 that executes, and memory 18 that stores, computer-executable instructions and/or computer-readable data for performing the various techniques and/or methods described herein. The memory 18 may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a ROM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

Figure 2:
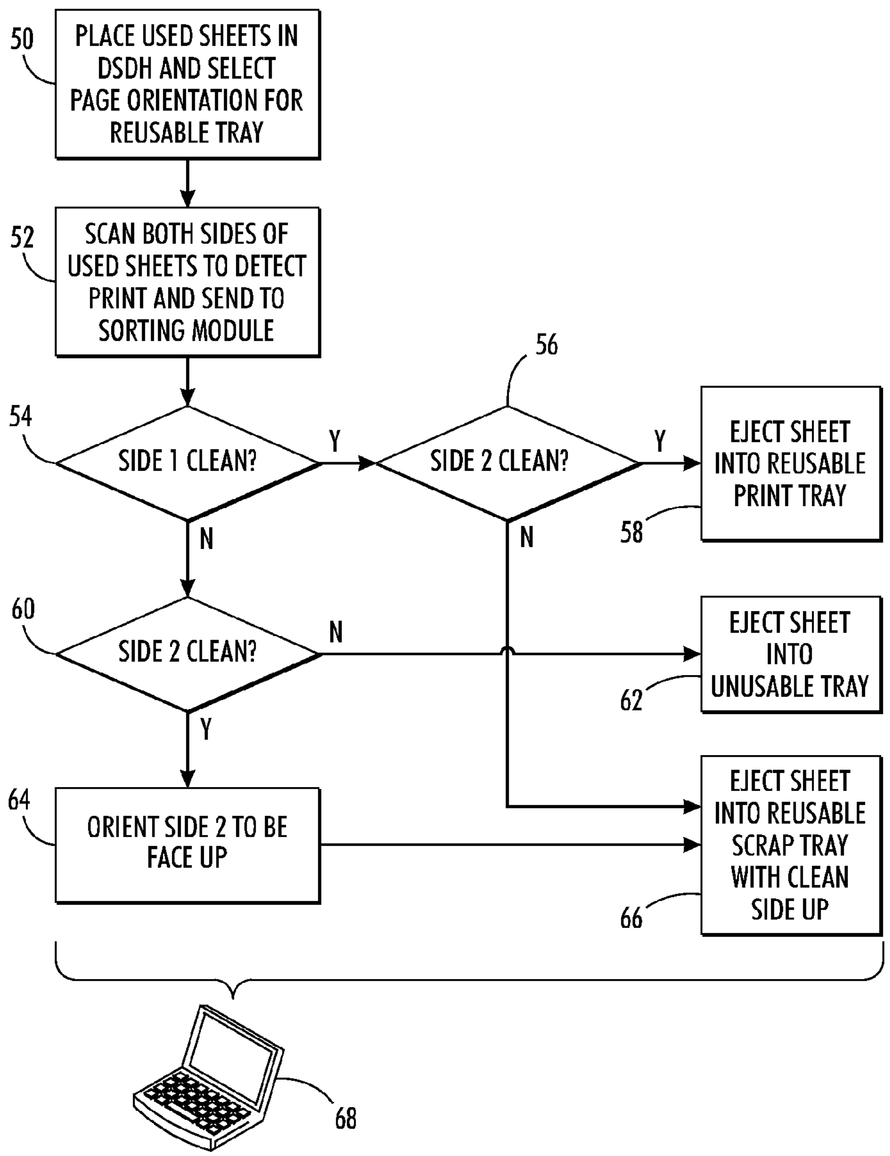

FIG. 2 illustrates a method of sorting printed pages for reuse in order to reduce waste and the like. At 50, printed pages are received at or placed in a DSDH module, and page orientation information is received. For instance, a user may select to have reusable pages output with the clean side face up or face down. For the remainder of this document, it will be assumed that the selected page orientation is face-up. At 52, the DSDH scans both sides of the used pages to detect print on the pages, after which the pages are sent to a sorter module. At 54, a determination is made regarding whether a first side (e.g., the top side of the page) is clean. If so, then at 56, a determination is made regarding whether a second side (e.g., the bottom side) of the page is clean. If the first and second sides of the page are clean as determined at 54 and 56, then at 58 the page is ejected into a reusable print tray (e.g., a clean tray), which may be a tray from which a user manually retrieves the clean pages for insertion into a printer or other device. In another example, the reusable print is an input tray for a printer or other device (e.g., routing of the clean page to a device for reuse is automated).

If the determination at 54 indicates that the first side of the page includes print (e.g., side 1 is not clean), then at 60 a determination is made regarding whether side 2 is clean. If not, then at 62, the page is ejected into an unusable tray because it is printed on both sides. If the determination at 60 indicates that side 2 is clean, then the page is oriented so that the clean side faces up, at 64. At 66, the face-up reusable page is ejected into a reusable tray. If the determination at 54 indicates that side 1 is clean, and determination at 56 indicates that side 2 is printed, then at 66, the page is ejected into the reusable tray (e.g., the reorientation of the page at 64 is not necessary because a clean side face-up orientation has been selected). In this manner, pages with print on both sides are discarded (e.g., to the unusable tray), clean pages with no print on either side are routed to a clean tray for reinsertion into a printer or scanner or the like (e.g., reuse as clean sheets), and pages with print on only one side are uniformly oriented to ensure that their clean sides face a common direction (e.g., up or down), and are output for reuse (e.g., as scrap paper for notes, as printable paper for labels, or the like). The method may be implemented at least in part on a computer 68 or the like.

Figure 3:
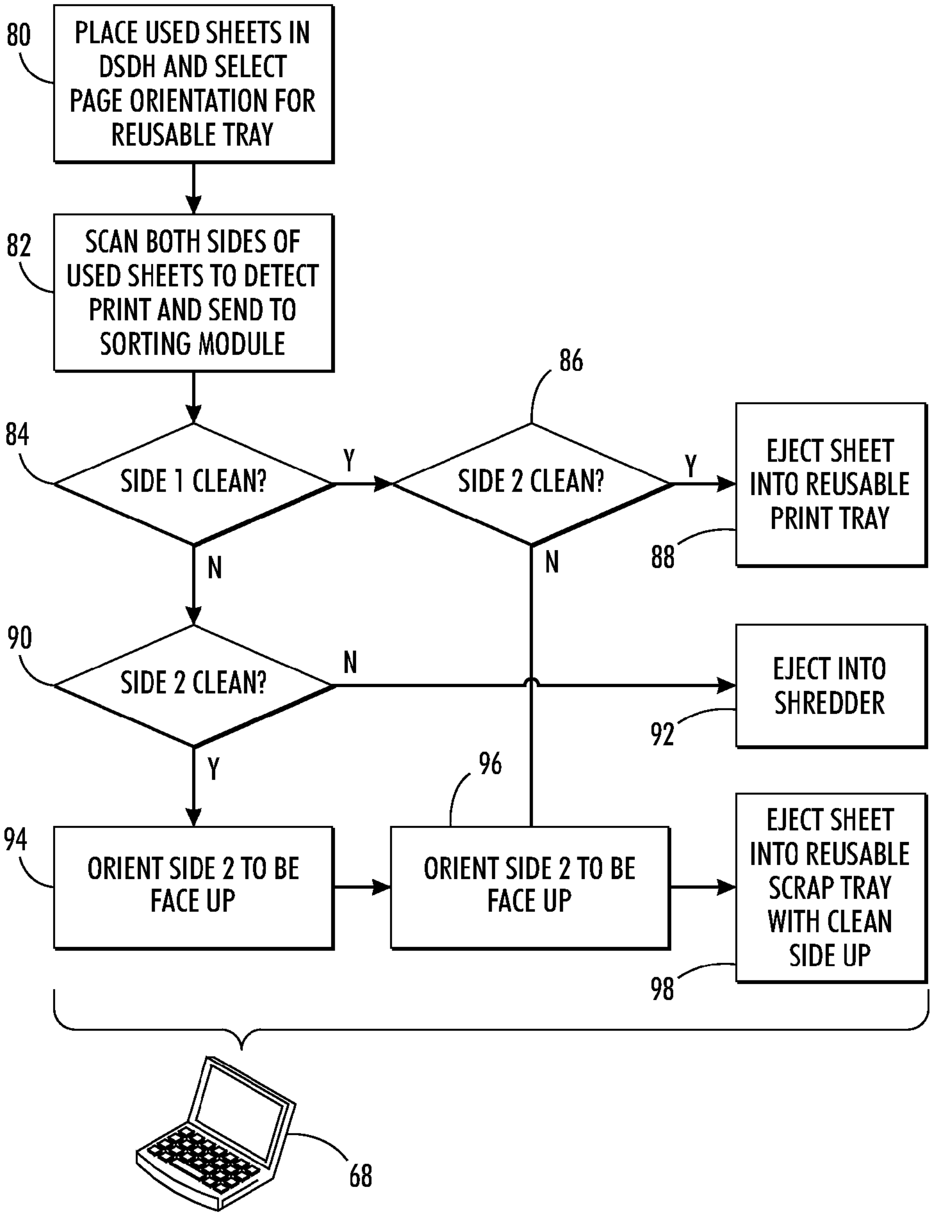
FIG. 3 illustrates a method of sorting printed pages for reuse in order to reduce waste and the like, and for obscuring print on reusable pages to ensure that sensitive printed material is not visible.

FIG. 3 illustrates a method of sorting printed pages for reuse in order to reduce waste and the like, and for obscuring print on reusable pages to ensure that sensitive printed material is not visible. At 80, printed pages are received at or placed in a DSDH module, and page orientation information is received. For instance, a user may select to have reusable pages output with the clean side face up or face down. For the remainder of this document, it will be assumed that the selected page orientation is face-up. At 82, the DSDH scans both sides of the used pages to detect print on the pages, after which the pages are sent to a sorter module. At 84, a determination is made regarding whether a first side (e.g., the top side of the page) is clean. If so, then at 86, a determination is made regarding whether a second side (e.g., the bottom side) of the page is clean. If the first and second sides of the page are clean as determined at 84 and 86, then at 88 the page is ejected into a reusable print tray (e.g., a clean tray), which may be a tray from which a user manually retrieves the clean pages for insertion into a printer or other device. In another example, the reusable print tray is an input tray for a printer or other device (e.g., routing of the clean page to a device for reuse is automated).

If the determination at 84 indicates that the first side of the page includes print (e.g., side 1 is not clean), then at 90 a determination is made regarding whether side 2 is clean. If not, then at 92, the page is ejected into a shredding device (e.g., a paper shredder or the like) to ensure that potentially sensitive information on the page is destroyed. If the determination at 90 indicates that side 2 is clean, then the page is oriented so that the clean side faces up, at 94. At 96, a security pattern (e.g., a watermark, interference pattern or lines, blackout bars or boxes, interfering text, etc.) is printed over the text on the side 1 of the page or over all of side 1 of the page. At 98, the face-up reusable page is ejected into a reusable tray.

If the determination at 84 indicates that side 1 is clean, and determination at 86 indicates that side 2 is printed, then at 96, a security pattern (e.g., a watermark, interference pattern or lines, blackout bars or boxes, interfering text, etc.) is printed over the text on the side 2 of the page or over all of side 2 of the page. At 98, the face-up reusable page is ejected into a reusable tray. In this case, reorientation of the page at 94 is not necessary because a clean side face-up orientation has been selected). In this manner, pages with print on both sides are destroyed (e.g., by the shredder), clean pages with no print on either side are routed to a clean tray for reinsertion into a printer or scanner or the like (e.g., reuse as clean sheets), and pages with print on only one side are sanitized to obscure potentially confidential information and uniformly oriented to ensure that their clean sides face a common direction (e.g., up or down), and are output for reuse (e.g., as scrap paper for notes, as printable paper for labels, or the like). It will be appreciated that reorientation of the page at 94 may be performed before or after printing of the security pattern. The method may be implemented at least in part on a computer 68 or the like.

Figure 4:
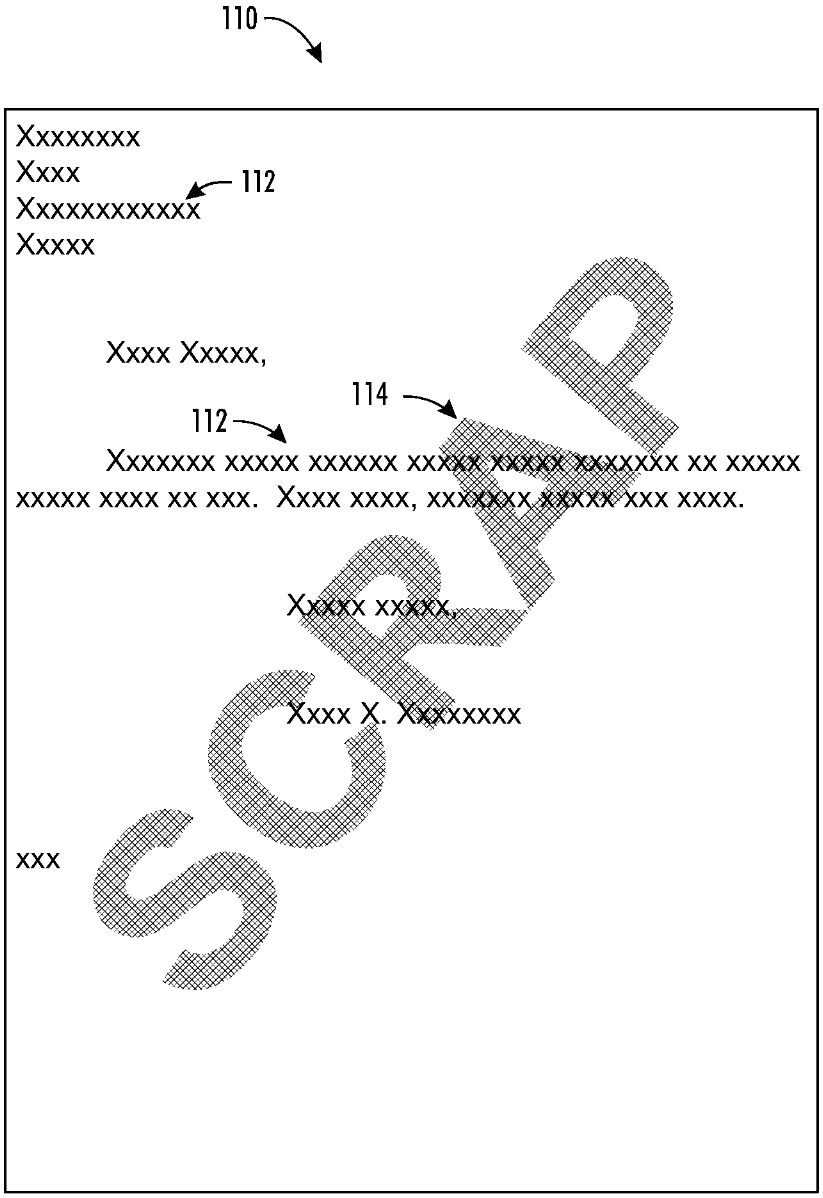
FIG. 4 illustrates an example of a reusable page that includes text or print.

FIG. 4 illustrates an example of a reusable page 110 that includes text or print 112. A watermark 114 is printed across the printed side of the page and identifies the page as scrap, wherein the opposite side of the page (the unprinted or clean side) can be reused for labels, scrap paper, etc. The watermark is shown as covering a portion of the text, and can be varied in size to cover more or less of the text as deemed appropriate by a user to conceal or otherwise render illegible the text in the event that the subject matter of the text is confidential.

Figure 5:
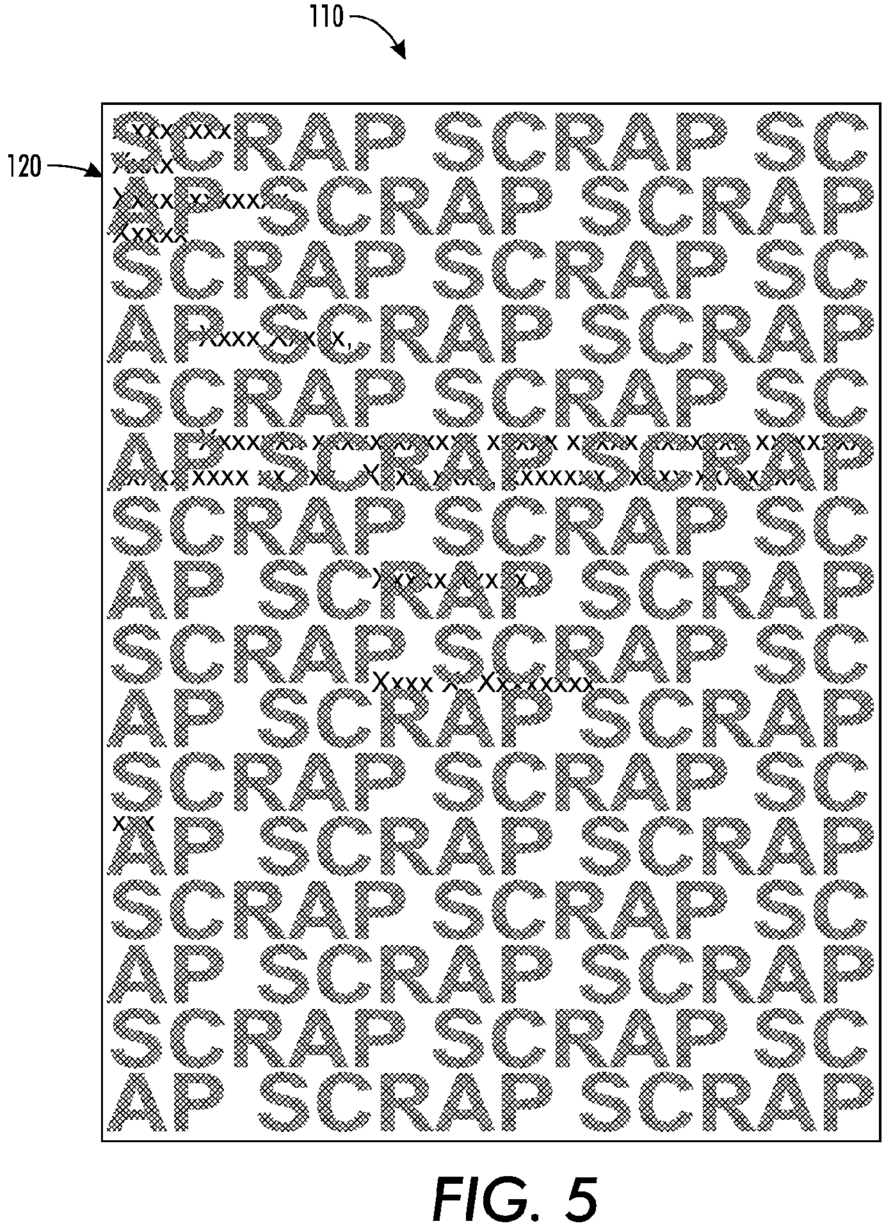
FIG. 5 illustrates an example of the reusable page in which a security pattern is printed over the printed side of the page.

FIG. 5 illustrates an example of the reusable page 110 in which a security pattern 120 is printed over the printed side of the page. The security pattern 120 comprises multiple instances of the word "scrap," arranged in a pattern of sufficient darkness to obscure the text printed on the page. It will be appreciated that any suitable letters or numbers may be employed to generate the security pattern, and that the herein described examples and aspects are not limited to the word "scrap."

Figure 6:
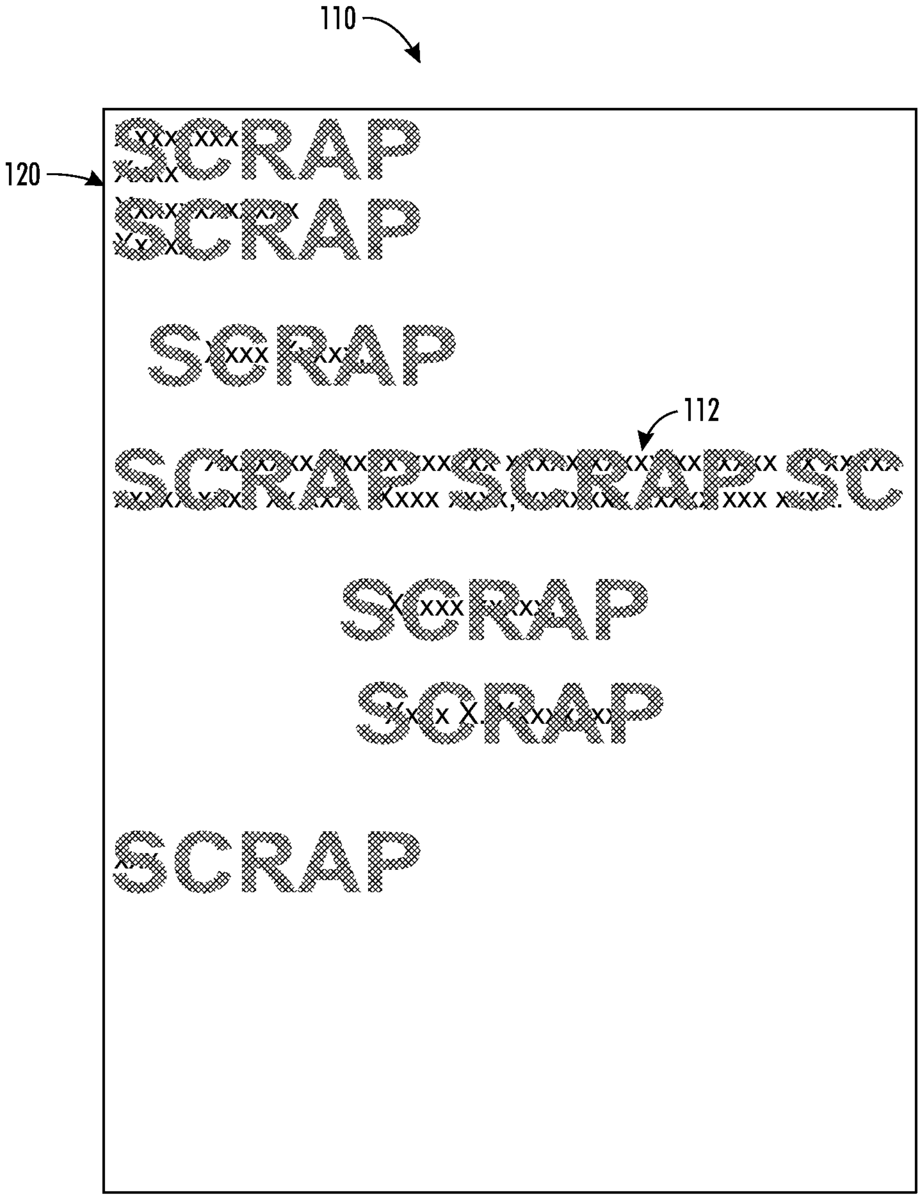
FIG. 6 illustrates an example of the reusable page in which the security pattern is printed only over text or printed regions of the printed side of the page.

FIG. 6 illustrates an example of the reusable page 110 in which the security pattern 120 is printed only over text 112 or printed regions of the printed side of the page. In this manner text and/or other printed matter (images, graphics, etc.) is obstructed while toner or ink is conserved, thereby further reducing waste and cost.

Figure 7:
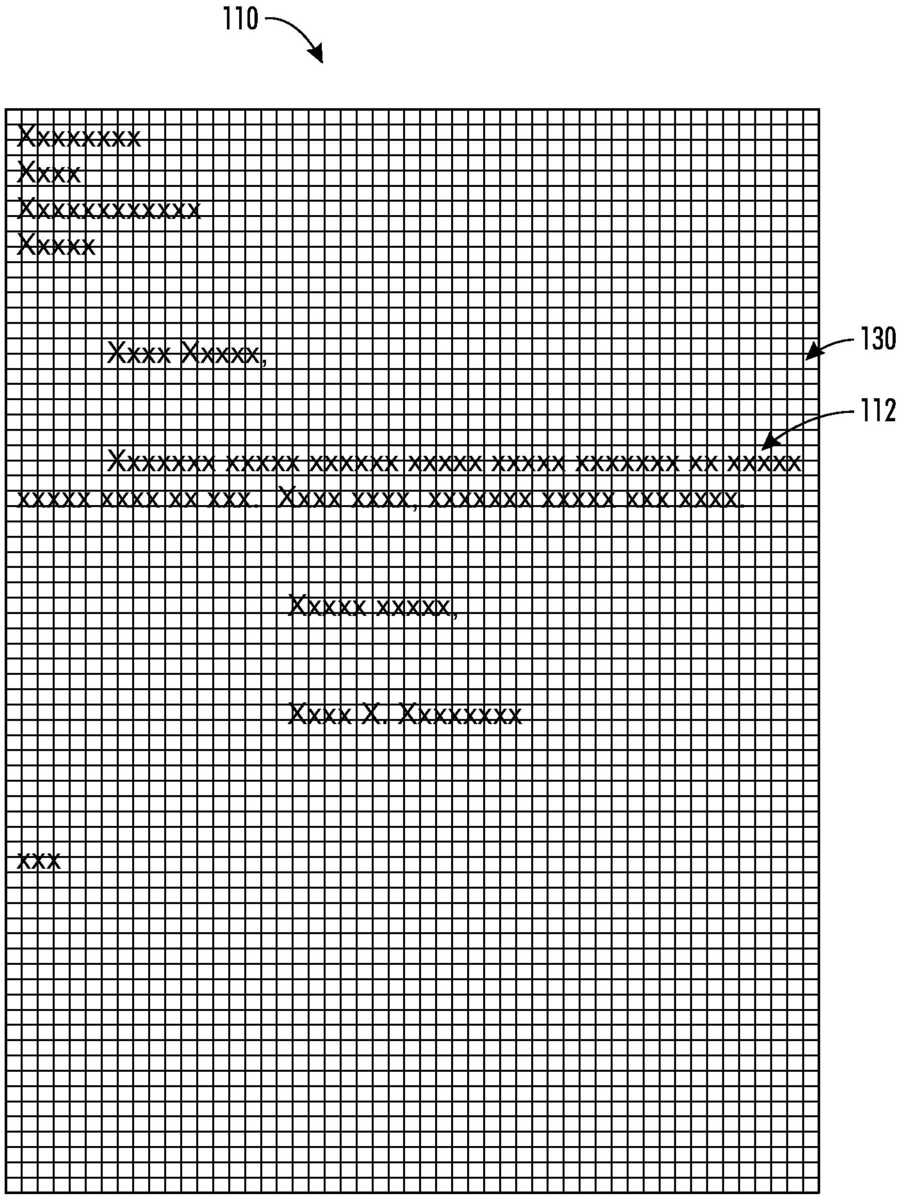
FIG. 7 illustrates an example of the reusable page in which an interference pattern is printed over the entire page to conceal potentially confidential text or subject matter.

FIG. 7 illustrates an example of the reusable page 110 in which an interference pattern 130 is printed over the entire page to conceal potentially confidential text 112 or subject matter. According to another example, the interference pattern is printed only over regions containing print or text, as in FIG. 6. It will be appreciated that the interference pattern may be any pattern or set of lines, uniform or random, that obscures the printed regions of the page sufficiently to make the text illegible.

Figure 8:
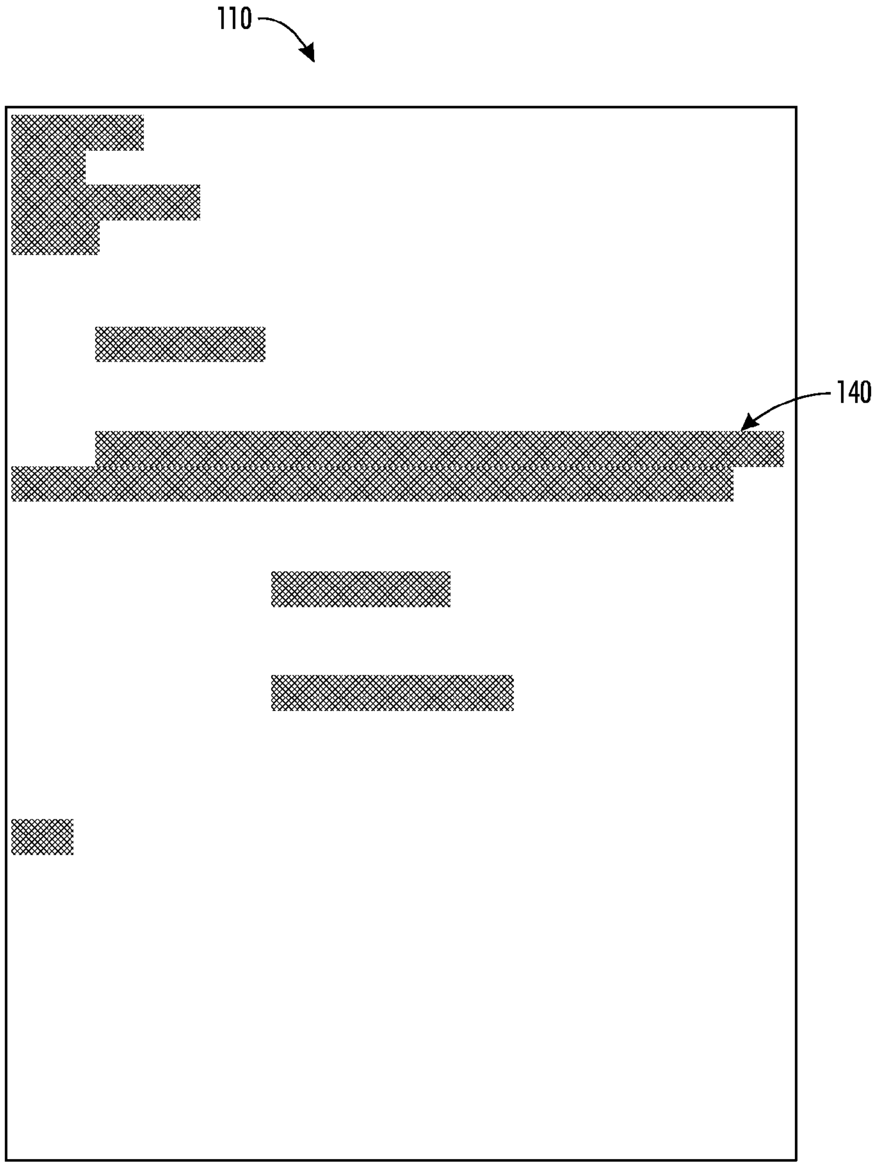
FIG. 8 illustrates an example of the reusable page in which an blackout bars or boxes are printed over the entire page to conceal potentially confidential text or subject matter.

FIG. 8 illustrates an example of the reusable page 110 in which an blackout bars or boxes 140 are printed over the entire page to conceal potentially confidential text or subject matter. In this manner, only the potentially confidential text or printed subject matter is obscured, which conserves toner or ink and reduces costs associated with printing the security pattern or blackout bars 140.

The methods illustrated in FIGS. 2 and 3 may be implemented in a computer program product that may be executed on a computer 68 or processor such as the processor 16 in the system of FIG. 1. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 16 of FIG. 1, a system memory such as the memory 18 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for sorting printed pages according to reusability, comprising:
- a duplex scanning document handler that receives and scans both sides of a plurality of unsorted used pages and detects print on zero or more sides of the pages;
- a sorting module including a processor that executes computer-executable instructions for:
- determining whether one or more sides of an unsorted page is printed; and
- sorting each page according to a number of sides on which print is detected;
- wherein the sorting module:
- routes duplex printed pages with print on both sides to a first tray;
- orients simplex printed pages with print on only one side to face the printed side downward and routes the oriented pages to a second tray; and
- routes pages with no print on either side to a third tray; and
- a printer that prints a security pattern over text on a the printed side of the simplex printed pages, wherein the security pattern renders the text illegible.

2. The system of claim 1, wherein the document handler outputs pages in the first tray to at least one of:
- a user for manual discard; and
- directly to a receptacle coupled to the document handler.

3. The system of claim 1, further comprising a shredder through which the printed pages pass from the first tray before entering the waste receptacle.

4. The system of claim 1, wherein the sorting module outputs pages in the second tray to a user for use as scrap pages.

5. The system of claim 4, wherein the printer marks the printed side of the simplex printed pages as being reusable pages.

6. The system of claim 5, wherein the printer marks the printed side of the simplex printed pages with a watermark.

7. The system of claim 4, wherein the printer prints a security pattern over the entire printed side of the simplex printed pages, wherein the security pattern renders text on the illegible.

8. The system of claim 1, wherein the sorting module outputs pages having no print on either side at least one of:
- to a user for reloading into a hopper of unused pages for printing;
- directly to an input tray that holds unused pages for printing.

9. A method of sorting printed pages according to reusability, comprising:
- scanning both sides of a plurality of unsorted used pages and detects print on zero or more sides of the pages;
- determining whether one or more sides of an unsorted page is printed;

sorting each page according to a number of sides on which print is detected;

routing duplex printed pages with print on both sides to a first tray;

orienting simplex printed pages with print on only one side to face the printed side downward;

routing the oriented pages to a second tray;

routing pages with no print on either side to a third tray; and printing a security pattern over text on the printed side of the simplex printed pages, wherein the security pattern renders the text illegible.

10. The method of claim 9, further comprising outputting pages in the first tray to at least one of:

a user for manual discard; and directly to a receptacle coupled to the document handler.

11. The method of claim 9, further comprising shredding duplex printed pages from the first tray.

12. The method of claim 9, further comprising outputting simplex printed pages in the second tray to a user for use as scrap pages.

13. The method of claim 12, further comprising marking the printed side of the simplex printed pages to indicate that the simplex printed pages are reusable pages.

14. The method of claim 13, further comprising marking the printed side of the simplex printed pages with a watermark.

15. The method of claim 12, further comprising printing blackout bars over text on the printed side of the simplex printed pages, wherein the blackout bars obscure the text and render the text illegible.

16. The method of claim 12, further comprising printing a security pattern over the entire printed side of the simplex printed pages, wherein the security pattern renders text on the illegible.

17. The method of claim 9, further comprising outputting pages having no print on either side at least one of:

to a user for reloading into a hopper of unused pages for printing;

directly to an input tray that holds unused pages for printing.

18. A method of sorting printed pages according to reusability, comprising:

scanning both sides of a plurality of unsorted used pages and detects print on zero or more sides of the pages;

determining whether one or more sides of an unsorted page is printed;

sorting each page according to a number of sides on which print is detected;

routing duplex printed pages with print on both sides to a first tray;

printing an interference pattern over printed regions on simplex printed pages with print only on one side, the interference pattern rendering the printed regions illegible;

orienting the simplex printed pages to face the printed side downward;

routing the oriented simplex printed pages and pages with no print on either side to a second tray;

discarding pages in the first tray; and printing a security pattern over text on the printed side of the simplex printed pages, wherein the security pattern renders the text illegible.

* * * * *